UNITED STATES PATENT OFFICE.

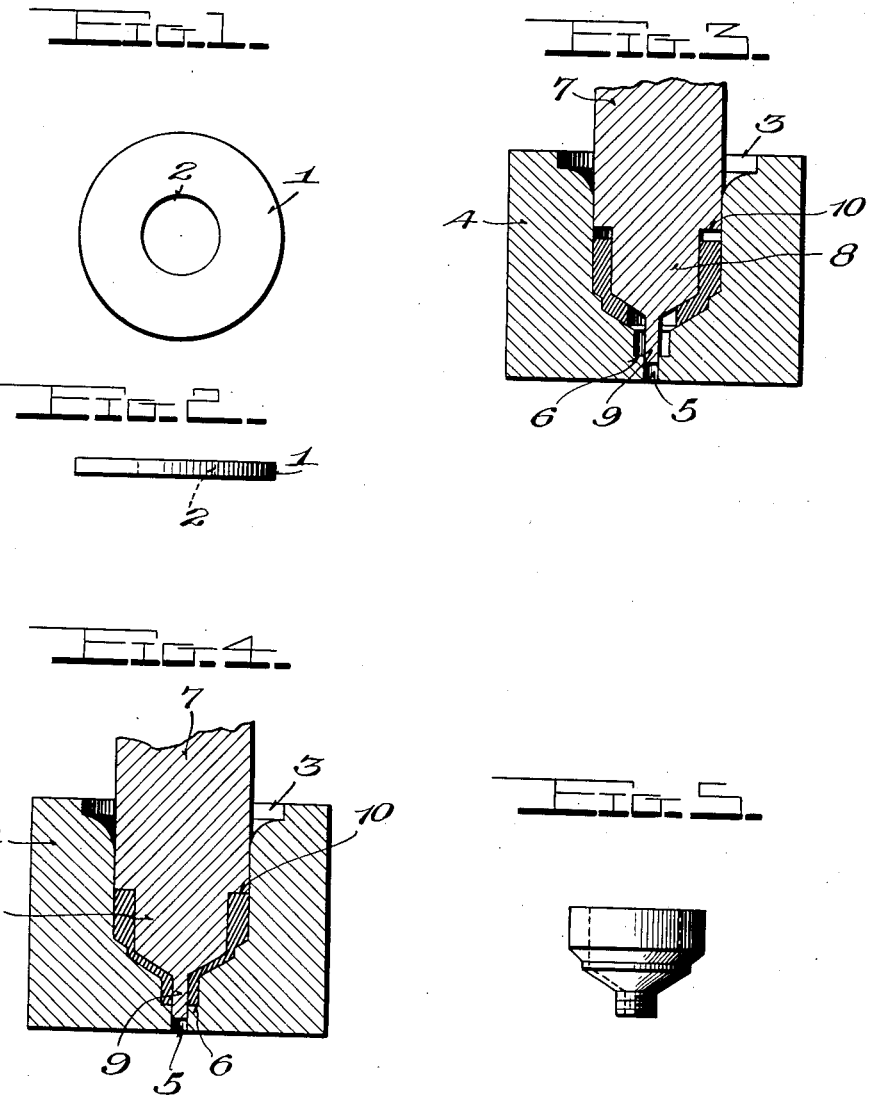

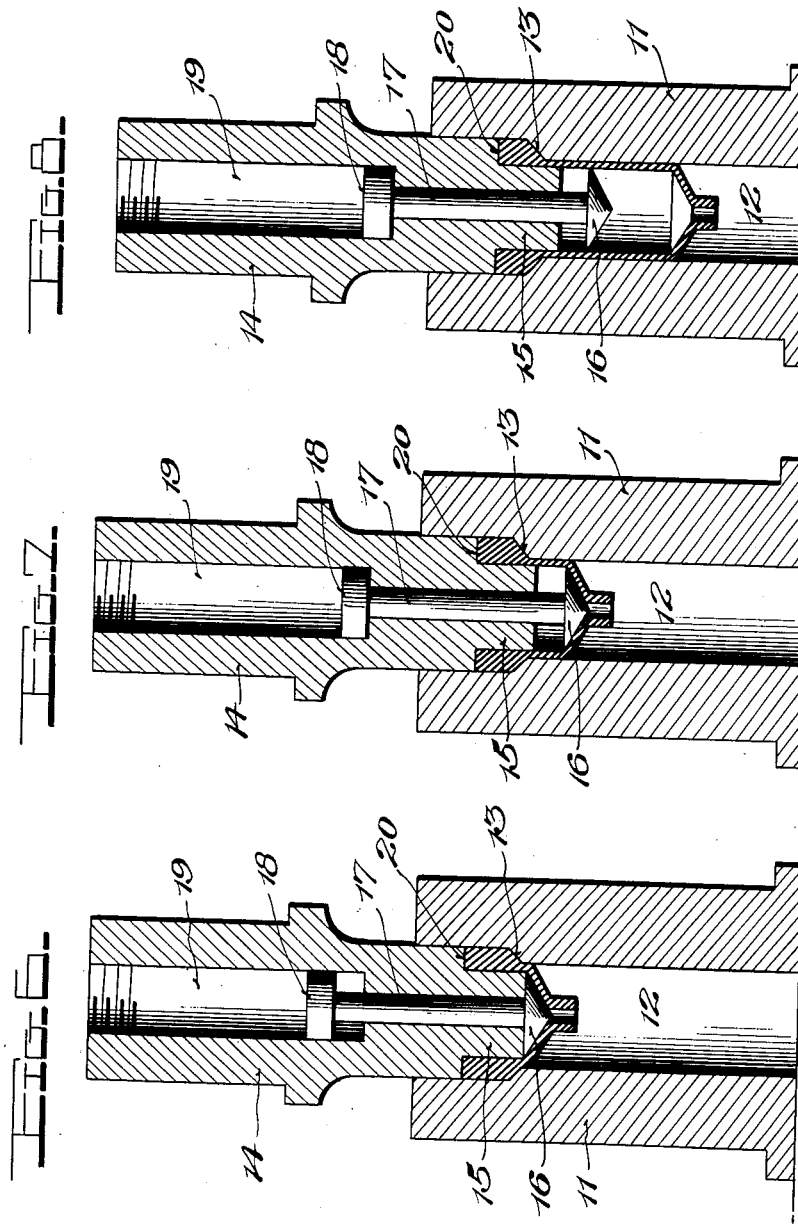

WILLIAM C. HUNTOON, OF PROVIDENCE, RHODE ISLAND.

ART OF EXTRUDING COLLAPSIBLE TUBES.

1,376,373.  Specification of Letters Patent.  Patented Apr. 26, 1921.

Application filed June 10, 1919. Serial No. 303,180.

*To all whom it may concern:*

Be it known that I, WILLIAM C. HUNTOON, a citizen of the United States, residing at Providence, in the county of Providence and State of Rhode Island, have invented new and useful Improvements in the Art of Extruding Collapsible Tubes, of which the following is a specification.

This invention relates to certain new and useful improvements in the art of extruding collapsible tubes, and it has for its primary object and aim to extrude the tubes from substantially flat blanks of metal by means of a die having a plunger which is subjected to pressure for effecting the extrusion therewithin.

The invention further resides in the initial formation of the head or discharge end of the tube with a substantial body to permit working of the same, as for threading the neck and marking the surrounding top with the manufacturer's name or other data, without injury to or collapse of the said head.

A further object of the invention resides in the step of guiding the tube during the process of extrusion to prevent the collapse or misshaping thereof.

Further objects will hereinafter appear as the description progresses and those steps and sequence of steps on which protection is desired will be succinctly defined in the appended claims.

In the drawings:

Figure 1, is a plan view of the blank from which the tube is formed; and

Fig. 2, is an edge view of the same;

Fig. 3, is a vertical section through the die subsequent to the initial shaping step;

Fig. 4, is a similar view depicting the blank with its central portion extruded to provide the top wall and the neck;

Fig. 5, shows the blank after having been acted upon by the die in the first two steps and the neck screw threaded and squared up;

Fig. 6, depicts the blank arranged in the finishing die;

Figs. 7 and 8, illustrate the further process of extruding a tube.

Preferably, the blank 1 from which the tubes are extruded are circular or disk shape and formed with a central aperture 2. The blank is placed within the shallow recess 3 of the female part 4 of the initial forming die, said part having a head-shaping cavity opening upwardly through the bottom of the shallow recess and being itself formed with a conical bottom leading to a central orifice 5 which is counterbored to define a limit or stop shoulder 6. This formation of the female part of the die imparts the external shape to the resulting head or upper portion of the tube. The male part or plunger 7 slidably fits the cylindrical cavity of the female part and is provided with a reduced cone extension 8 which has its outer end cone-shape and equipped with a depending pin extension 9.

The initial step or operation of the plunger on the blank is depicted in Fig. 3 wherein it will be noted that the pin extension 9 enters the central aperture 2 of the blank; the conical outer or lower end carries the central portion of the blank down onto the conical bottom of the cylindrical cavity; and the outer edge portion of the blank is turned up into the form of a cylinder, conforming to the cylindrical portion of the die cavity.

The second step or movement of the plunger, which may be a continuation of the initial movement, exerts sufficient pressure on the top wall, or the depressed central portion of the blank, to force the metal thereof inwardly and downwardly into the central orifice 5 to form the neck of the tube. It will be noted that the pin extension enters the lower end of the orifice and stops the same against the escape of metal while at the same time provides the neck with a discharge opening or mouth. It will also be noted that the shoulder 10 at the base of the core extension 8 has merely moved-up against the body-forming-portion of the blank without exerting pressure thereon except that which may occur as back pressure resulting from the neck-extrusion step.

The stamped blank, as it appears when removed from the initial shaping die, is shown in Fig. 5 with the exception that the threading of the neck and the squaring up of the same is preferably performed after removal from the die.

In this condition the top wall may also be marked about the neck with the name of the manufacturer or producer or with such advertising matter as may be desired. This is ably and expeditiously accomplished while the blank is at this stage of tube formation without injury thereto by reason of the extra thickness of the side wall which is to be extruded into the pliable collapsible tube wall. It is evident that if desired the name of the manufacturer or any form of ornamentation whether raised or depressed may be formed in the conical bottom of the female part 4 so as to appear on stamped blank.

The extrusion of the side wall is effected by the die illustrated in Figs. 6, 7 and 8. The female part 11 of this die has a cylindrical bore 12 counterbored at its upper end to form an annular, downwardly tapering or conical shoulder 13 on which the partly shaped blank is disposed. The male part or plunger is then lowered to rest on the blank as depicted in Fig. 6. This plunger comprises a body 14 fitting the counterbore of the female part and formed with a reduced extension 15 designed to be received within the bore 12 for defining the thickness of the tube wall as it is extruded, said extension having a diameter of predetermined size depending upon the thickness of the wall desired. The plunger 14 is also equipped with a follower or guide 16 having a conical head, to fit the top wall of the tube and of the same diameter as the extension 15, and a stem 17 slidably fitting a bearing extending axially through the plunger body. The upper end of the stem carries a weight or enlargement 18 operating in a cylindrical bore 19 to cause the follower to more quickly gravitate. The enlargement may be acted upon by fluid or spring pressure to cause the head of the plunger to follow the top wall of the tube. The dropping or falling movement of the follower is limited by the enlargement 18 so that the normal or lowermost position of the head of the follower will be but a short distance below the extension 15. This arrangement is advantageous in that the follower head, which is equal in diameter to the extension 15, functions to guide and gage the side wall and diameter of the tube adjacent to where it is extruded, thereby providing spaced points by which the tube is guided. The follower not only centers the partly formed blank in the female part of the die but also gages the uniform thickness of the wall during extrusion and prevents misshaping thereof.

Subsequent to leaving the follower the tube does not require any guiding or steadying such being only needed adjacent the point of extrusion and where the metal is forced from off the inclined shoulder 13. The degree of extrusion may be governed according to the length of tube desired or by the expending of all the metal in advance of the shoulder 20 of the plunger.

Having thus described my invention, what I claim as new and desire to secure by Letters Patent is—

1. The art of extruding collapsible tubes, consisting in placing a centrally apertured disk in a die, inserting a plunger to draw the blank down into the die to thereby form an inverted blank comprising a cylindrical side wall and a top wall, and then exerting pressure on the top wall to force the same into the central aperture in a substantially radial direction and then axially to extrude a neck therefrom by thinning out the top wall and leaving the side wall of original thickness.

2. The art of extruding collapsible tubes from flat blanks, consisting in exerting pressure on the central portion of the blank to extrude the same inwardly to contract the central aperture and to form the upper portion of the tube, and then extruding the side wall of the tube from the outer portion of the blank.

3. The art of extruding collapsible tubes from flat blanks, consisting in drawing out the central portion of the blank to form the top wall and neck of the tube, threading the neck, and finally drawing out the remainder of the blank to form the side of the tube.

4. The art of extruding collapsible tubes from flat blanks, consisting in pressing the central portion of a blank axially to one side for forming the top of the tube and drawing the outer portion of the blank to the opposite side and extruding the side wall of the tube therefrom.

In testimony whereof I have signed my name to this specification in the presence of two subscribing witnesses.

WILLIAM C. HUNTOON.

Witnesses:
BESSIE P. TOOMEY,
J. A. MILLER.